US011336550B2

(12) United States Patent
Hirschmann et al.

(10) Patent No.: US 11,336,550 B2
(45) Date of Patent: May 17, 2022

(54) SIGNAL ANALYSIS METHOD AND MEASUREMENT SYSTEM

(71) Applicant: Rohde & Schwarz GmbH & Co. KG, Munich (DE)

(72) Inventors: Susanne Hirschmann, Munich (DE); Florian Ramian, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 217 days.

(21) Appl. No.: 16/862,899

(22) Filed: Apr. 30, 2020

(65) Prior Publication Data

US 2021/0344579 A1    Nov. 4, 2021

(51) Int. Cl.
| | | |
|---|---|---|
| *H04B 17/15* | (2015.01) | |
| *H04L 43/0823* | (2022.01) | |
| *H04L 43/045* | (2022.01) | |
| *H04B 17/17* | (2015.01) | |

(52) U.S. Cl.
CPC ......... *H04L 43/0823* (2013.01); *H04B 17/15* (2015.01); *H04B 17/17* (2015.01); *H04L 43/045* (2013.01)

(58) Field of Classification Search
CPC ...... H04B 17/318; H04B 17/15; H04B 17/17; H04L 43/045; H04L 43/0823
USPC ................................................. 375/224, 350
See application file for complete search history.

(56) References Cited

U.S. PATENT DOCUMENTS

| | | | | |
|---|---|---|---|---|
| 6,300,889 | B1* | 10/2001 | Piasecki ................ | H03M 1/108 |
| | | | | 341/110 |
| 8,947,276 | B1* | 2/2015 | Yu .......................... | H03M 1/109 |
| | | | | 341/120 |
| 9,874,607 | B1* | 1/2018 | Kuit ....................... | H03M 1/109 |
| 10,142,066 | B1* | 11/2018 | Draving ................ | G01R 29/027 |
| 2003/0220758 | A1* | 11/2003 | Nishimura ............. | H03M 1/109 |
| | | | | 702/117 |
| 2010/0103006 | A1* | 4/2010 | Miyake .................. | H03M 1/109 |
| | | | | 341/120 |
| 2012/0134404 | A1 | 5/2012 | Strait | |
| 2015/0155842 | A1* | 6/2015 | Shuttleworth ......... | H03G 7/002 |
| | | | | 381/98 |
| 2020/0228434 | A1* | 7/2020 | Olgaard ................ | H04B 17/318 |

FOREIGN PATENT DOCUMENTS

| | | |
|---|---|---|
| EP | 2336791 B1 | 6/2011 |
| JP | H11-234354 A1 | 8/1999 |
| WO | 2007/038279 A2 | 4/2007 |

\* cited by examiner

*Primary Examiner* — Emmanuel Bayard
(74) *Attorney, Agent, or Firm* — Christensen O'Connor Johnson Kindness PLLC

(57) ABSTRACT

A signal analysis method comprising: receiving an input signal, the input signal comprising a symbol sequence; receiving samples of a reference signal based on a known sample rate, the reference signal comprising the same symbol sequence as the input signal; determining symbol points of the symbol sequence based on the samples; determining measurement times based on the symbol points; and determining at least one signal quality parameter at the measurement times, wherein the at least one signal quality parameter is indicative of a signal quality of the input signal. Further, a measurement system is described.

19 Claims, 2 Drawing Sheets

SIGNAL ANALYSIS METHOD AND MEASUREMENT SYSTEM

FIELD OF THE DISCLOSURE

Embodiments of the present disclosure generally relate to a signal analysis method. Embodiments of the present disclosure further relate to a measurement system.

BACKGROUND

Error-vector-magnitude (EVM) and other signal quality measurement values are often calculated without involving a demodulator, which is typically called raw EVM. One way of calculating a raw EVM is by comparing a measured signal against a known reference waveform file as transmitted by a source in that measurement setup.

In some cases, the raw EVM may deviate significantly from an EVM calculated only on a symbol base. As the signal quality at the symbol point may be more relevant depending on the application, the symbol based EVM may be the more relevant quantity.

Methods to determine the signal quality at the symbol points are known in the state of art. However, these methods usually need a demodulator for demodulating the respective signal and finding the signal points.

Thus, the implementation effort is increased compared to the raw EVM measurements which in turn increases the costs associated therewith while decreasing the efficiency of the measurement system or rather the signal analysis method.

Accordingly, there is a need for an alternative signal analysis method as well as an alternative measurement system that are capable of reliably determining the EVM of an input signal on a symbol base.

SUMMARY

Embodiments of the present disclosure provide a signal analysis method. In an embodiment, the signal analysis method comprises the following steps:

receiving an input signal, the input signal comprising a symbol sequence;

receiving samples of a reference signal based on a known sample rate, the reference signal comprising the same symbol sequence as the input signal;

determining symbol points of the symbol sequence based on the samples;

determining measurement times based on the symbol points; and determining at least one signal quality parameter at the measurement times, wherein the at least one signal quality parameter is indicative of a signal quality of the input signal.

Herein, the term "symbol point" is understood to denote the time at which the respective symbol is detected. For example, the symbol point may be the time at which the input signal crosses a decision threshold that is associated with a certain signal value.

For example, the input signal may be a binary signal, such that there are two different possible signal values. In other words, the input signal may be PAM-2 coded. In other embodiments, the input signal may also be a PAM-N coded signal, wherein N is an integer bigger than 2. In further examples, the input signal may be an OFDM signal, a single carrier signal or a frequency shift keying (FSK) signal.

The input signal may be received from a device under test, wherein the device under test may process the reference signal, thereby generating the input signal. Accordingly, the at least one signal quality parameter is a measure for the performance of the device under test when processing a respective signal, for example the reference signal.

According to the disclosure, the symbol points are determined directly based on the received samples. Then, measurement times are determined based on the determined symbol points. Quality measurements are performed by determining the at least one signal quality parameter only at these measurement times. In other words, the quality measurements are not performed for every sample, which would be the case for the above-mentioned raw EVM. Instead, the quality measurements are performed only at the relevant times, namely the measurement times.

In general, the measurement times are associated with portions of the input signal that are of particular relevance for assessing the quality of the input signal, and thus for assessing the performance of the device under test.

It is emphasized that no demodulation of the input signal and/or of the reference signal is required in order determine the symbol points and thus the measurement times. Instead, the symbol points and the measurement times are determined directly based on the reference signal or rather the received samples associated with the reference signal.

Thus, all types of quality measurements requiring knowledge of the symbol points can be performed without demodulating the input signal and/or the reference signal with the signal analysis method according to the disclosure.

Thus, the implementation effort is reduced compared to methods known from the state of the art.

It is noted that the sample rate does not have to be an integer multiple of the symbol rate of the symbol sequence. Thus, the signal points and/or the measurement times do not need to be at the same time as one of the received samples. Instead, the symbol points and/or the measurement times may lie in between two consecutive samples.

In order to determine the at least one signal quality parameter, an error signal may be determined, wherein the error signal is a difference between the input signal and the reference signal.

In some embodiments, the error signal may be determined at the measurement times in order to determine the at least one signal quality parameter.

According to an aspect of the present disclosure, the measurement times are equal to the symbol points. Thus, the at least one signal quality parameter is determined directly at the symbol points.

According to another aspect of the present disclosure, a symbol rate of the symbol sequence is known or the symbol rate is determined based on the samples.

For example, the symbol rate or rather the ratio between the symbol rate and the sample rate may be set by a user. The user may set the symbol rate and/or the ratio between the symbol rate and the sample rate via a suitable user interface, e.g. a touchscreen, a keyboard or any other input device.

Alternatively or additionally, the symbol rate may be automatically estimated via a blind symbol rate estimation technique and/or via a machine learning technique. In some embodiments, the machine learning technique may be configured to perform the respective estimation, for instance based on input values received. For this purpose, a machine learning model has been trained previously in an appropriate manner, for example, with a supervised training set.

In a further embodiment of the present disclosure, the symbol points are determined based on the symbol rate. In some embodiments, the symbol points are determined based on both the received samples and the symbol rate. Thus, the measurement times are also determined based on both the received samples and the symbol rate.

According to another aspect of the present disclosure, at least one of the input signal and the reference signal is resampled, thereby generating a set of resamples, wherein the set of resamples comprises at least one of samples at the symbol points and samples at the measurement times. As already mentioned above, the symbol points and/or the measurement times may respectively lie in between two consecutive samples. By interpolating the input signal samples and/or the reference signal samples, also called resampling, additional samples are acquired at the symbol points and/or at the measurement times.

Alternatively or additionally, the error signal described above may be resampled, such that error signal samples at the symbol points and/or at the measurement times are acquired.

In a further embodiment of the present disclosure, the input signal and the reference signal are synchronized based on at least one of the symbol points and the measurement times.

In some embodiments, the input signal and the reference signal may be synchronized via a blind synchronization technique or rather a blind synchronization algorithm.

The input signal and the reference signal may also be synchronized based on the sample rate and/or based on the symbol rate.

Optionally, additional information on the input signal and/or the reference signal may be provided to the blind synchronization algorithm in order to synchronize the input signal and the reference signal. For example, information on the modulation scheme of the input signal and/or on the modulation scheme of the reference signal may be provided to the blind synchronization algorithm.

According to an aspect of the present disclosure, the at least one signal quality parameter corresponds to an error-magnitude-vector parameter. For example, the at least one signal quality parameter may be a magnitude error and/or a phase error of the input signal with respect to the reference signal at the measurement times.

According to another aspect of the present disclosure, the reference signal comprises at least one marker. In general, the marker may indicate the symbol points in the reference signal.

Accordingly, the symbol rate may be determined based on the at least one marker. Alternatively or additionally, the input signal and the reference signal may be synchronized based on the at least one marker.

In a further embodiment of the present disclosure, at least one of the input signal, the reference signal and the at least one signal quality parameter is plotted against the measurement times. Thus, the at least one signal parameter is not plotted for all times associated with the individual received samples, but only at the relevant times, namely the measurement times. Thus, it is easier for a user to assess the quality of the input signal, because the relevant quantities are only plotted at the relevant times, namely the measurement times.

A plot of the at least one signal quality parameter, a plot of the input signal and/or a plot of the reference signal against the measurement times may be displayed on a display.

Embodiments of the present disclosure further provide a measurement system, comprising a first input, a second input and a signal analysis circuit or module. The first input is configured to receive an input signal, the input signal comprising a symbol sequence. The second input is configured to receive a reference signal associated with samples based on a known sample rate, the reference signal comprising the same symbol sequence as the input signal. The signal analysis module is configured to determine symbol points of the symbol sequence based on the samples. The signal analysis module is further configured to determine measurement times based on the symbol points. The signal analysis module is further configured to determine at least one signal quality parameter at the measurement times, wherein the at least one signal quality parameter is indicative of a signal quality of the input signal.

In some embodiments, the measurement system is configured to perform the signal analysis method(s) described above.

Regarding the advantages and further properties of the measurement system, reference is made to the explanations given above with regard to the signal analysis method(s), which also hold for the measurement system and vice versa.

The first input, the second input and/or the signal analysis module may be part of a measurement instrument. The measurement instrument may be established, for example, as an oscilloscope and/or as a vector network analyzer.

The measurement system may comprise a device under test that is connected to the first input. The device under test may process the reference signal, thereby generating the input signal. Accordingly, the at least one signal quality parameter is a measure for the performance of the device under test.

The measurement system may further comprise a signal generator being configured to generate the reference signal. The signal generator may be connected to the device under test and/or to the second input.

The measurement instrument may comprise the signal generator.

According to an aspect of the present disclosure, the measurement times are equal to the symbol points. Thus, the signal analysis module is configured to determine the at least one signal quality parameter directly at the symbol points.

According to another aspect of the present disclosure, the signal analysis module is configured to receive a symbol rate of the symbol sequence or the signal analysis module is configured to determine the symbol rate based on the samples. For example, the symbol rate or rather the ratio between the symbol rate and the sample rate may be set by a user via a user interface of the measurement system, e.g. via a touchscreen.

Alternatively or additionally, the signal analysis module may be configured to estimate the symbol rate via a blind symbol rate estimation technique and/or via a machine learning technique.

In a further embodiment of the present disclosure, the signal analysis module is configured to determine the measurement times based on the symbol rate. In some embodiments, the signal analysis module may be configured to determine the symbol points based on both the received samples and the symbol rate. Thus, the measurement times are also determined based on both the received samples and the symbol rate by the signal analysis module.

According to an aspect of the present disclosure, the signal analysis module is configured to resample at least one of the input signal and the reference signal, thereby generating a set of resamples, wherein the set of resamples comprises at least one of samples at the symbol points and samples at the measurement times. As already mentioned above, the symbol points and/or the measurement times may respectively lie in between two consecutive samples. By interpolating the input signal samples and/or the reference signal samples, also called resampling, the signal analysis module acquires additional samples at the symbol points and/or at the measurement times.

The measurement system may further comprise a synchronization circuit or module that is associated with the first input and with the second input, the synchronization module being configured to synchronize the input signal and the reference signal based on at least one of the symbol points and the measurement times. In some embodiments, the synchronization module may be configured to synchronize the input signal and the reference signal via a blind synchronization technique or rather a blind synchronization algorithm.

The synchronization module may be configured to synchronize the input signal and the reference signal based on the sample rate and/or based on the symbol rate.

According to an aspect of the present disclosure, the at least one signal quality parameter corresponds to an error-magnitude-vector parameter. For example, the at least one signal quality parameter may be a magnitude error and/or a phase error of the input signal with respect to the reference signal at the measurement times.

The reference signal may comprise a marker. In general, the marker may indicate the symbol points in the reference signal. Accordingly, the signal analysis module may be configured to determine the symbol rate based on the at least one marker.

Alternatively or additionally, the synchronization module may be configured to synchronize the input signal and the reference signal based on the at least one marker.

According to another aspect of the present disclosure, the signal analysis module is configured to generate a plot of at least one of the input signal, the reference signal and the at least one signal quality parameter against the measurement times. Thus, the at least one signal parameter is not plotted for all times associated with the individual received samples, but only at the relevant times, namely the measurement times.

In a further embodiment of the present disclosure, the measurement system comprises a display, wherein the display is configured to display the plot. The display may be established as a touchscreen or as any other suitable type of suitable.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
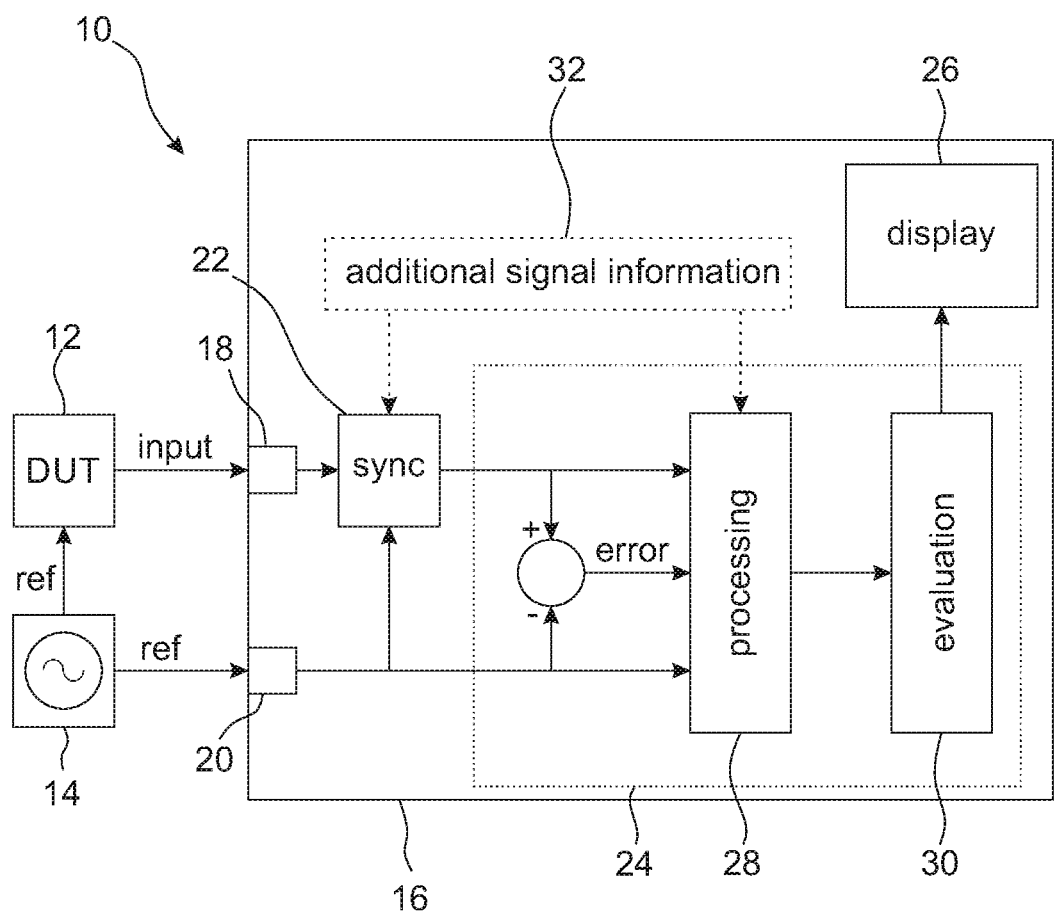
FIG. 1 shows a block diagram of a measurement system according to an embodiment of the present disclosure.

FIG. 1 schematically shows a measurement system 10 comprising a device under test 12, a signal generator 14, and a measurement instrument 16. In general, the measurement system 10 is configured to perform quality measurements on the device under test 12.

The device under test 12 may be any type of electronic device that is configured to receive a signal comprising a symbol sequence and to decode that signal. For example, the device under test 12 may be a receiver, for example a satellite receiver or a receiver of a mobile phone.

The signal generator 14 may be established as any type of signal generator that can generate a signal with a predefined waveform. For example, the signal generator is established as a numerically controlled oscillator. Without restriction of generality, the signal generator 14 is assumed to be a digital signal generator having a known sample rate in the following.

The signal generator 14 is configured to generate a reference signal that comprises a symbol sequence, wherein the reference signal serves as a test signal for the device under test 12. In FIG. 1, the reference signal is denoted by "ref". The reference signal may be a binary signal, i.e. the reference signal may be PAM-2 coded. Alternatively, the reference signal may be a PAM-N coded signal, wherein N is an integer bigger than 1. As another example, the reference signal may be a OFDM signal, a single carrier signal or a frequency shift keying (FSK) signal.

The reference signal is forwarded to the device under test 12. The device under test 12 processes the reference signal, thereby generating an input signal that is associated with the reference signal. In FIG. 1, the input signal is denoted by "input". Thus, the input signal corresponds to a processed version of the reference signal and comprises the same symbol sequence as the reference signal.

The measurement instrument 16 comprises a first input 18, a second input 20, a synchronization circuit or module 22, and a signal analysis circuit or module 24. Further, the measurement instrument 16 may comprise a display 26.

The measurement instrument 16 may be established as any type of measurement device that is suitable for measuring the performance of the device under test 12. For example, the measurement instrument 16 may be an oscilloscope, a signal analyzer, or a vector network analyzer. Optionally, the measurement instrument 16 may also comprise the signal generator 14.

The first input 18 is connected to the device under test 12 in a signal transmitting manner. The second input 20 is connected to the signal generator 14 in a signal transmitting manner Therein and in the following, the term "connected in a signal transmitting manner" is understood to denote all suitable wire-based and wireless connections, for example an electrical connection via cable or a wireless connection by radio.

The synchronization module 22 is connected to the first input 18 and to the second input 20 downstream of the inputs 18, 20. Therein and in the following, the terms "upstream" and "downstream" denote the signal propagation direction within the measurement system 10, wherein signals propagate from the upstream component to the downstream component.

In the embodiment of FIG. 1, the signal analysis module 24 comprises a signal processing circuit or module 28 and an evaluation circuit or module 30. The signal analysis module 24, or more precisely the signal processing module 28, is connected to the synchronization module 22 and to the second input 20 downstream of the synchronization module 22 and downstream of the second input 20, respectively. The evaluation module 30 is connected to the signal processing module 28 downstream of the signal processing module 28.

Figure 2:
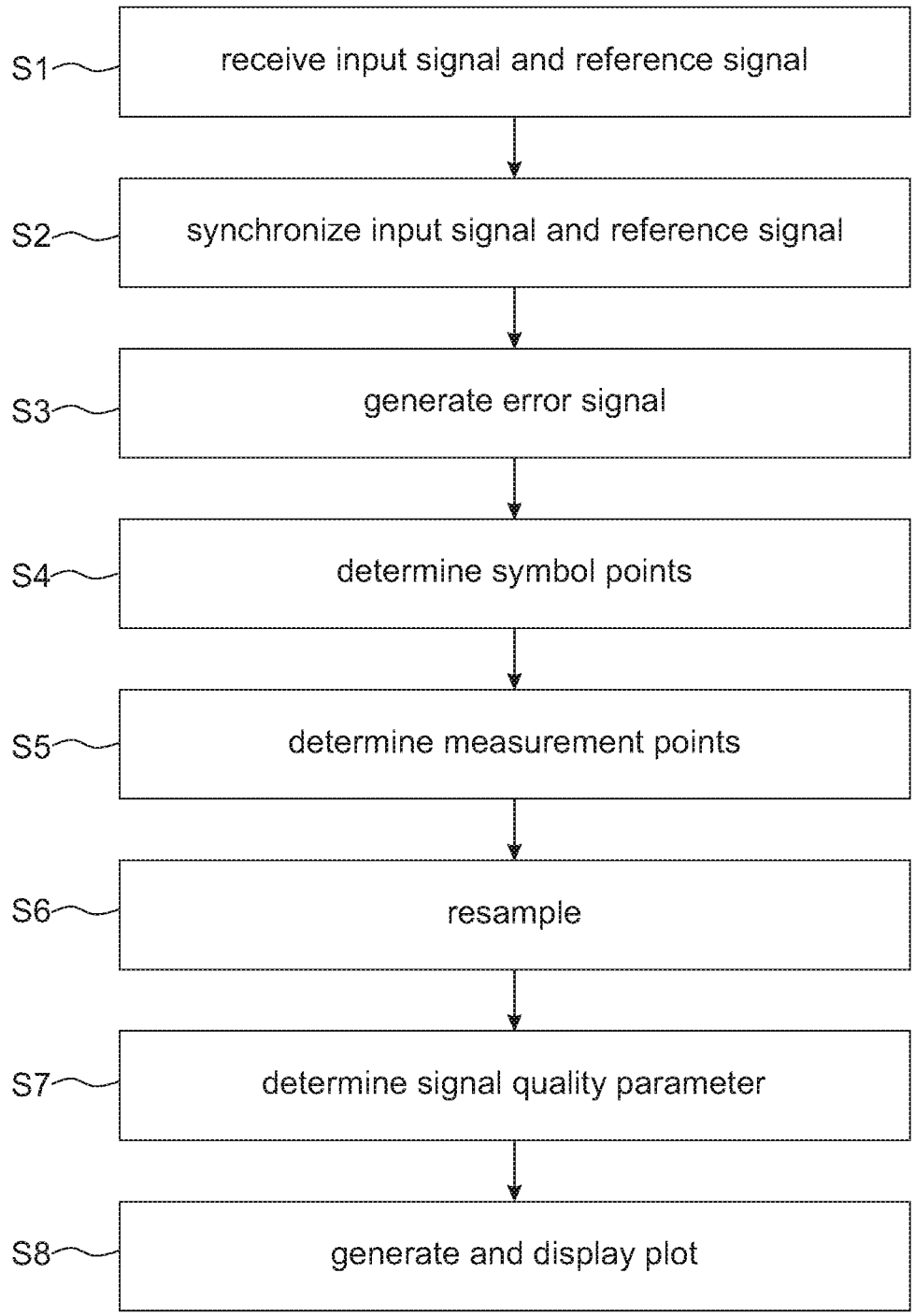
FIG. 2 shows a flow chart of a signal analysis method according to an embodiment of the present disclosure.

The measurement system 10 is configured to perform a signal analysis method that is described in the following with reference to FIG. 2.

The input signal and the reference signal described above are received via the first input 18 and the second input 20, respectively (step S1). The sample rate of the reference signal is known because the sample rate of the signal generator 14 is known, as described above.

The input signal and the reference signal are synchronized via the synchronization module 22 (step S2). The synchronization module 22 may synchronize the input signal and the reference signal via a blind synchronization technique or rather a blind synchronization algorithm. Accordingly, the output of the synchronization module is a synchronized input signal.

As is denoted by the block 32 in FIG. 1, the synchronization module 22 may receive additional information on the input signal and/or on the reference signal. For example, the measurement instrument may comprise a memory and information on the device under test 12 and/or information on the reference signal may be stored in that memory.

Additionally or alternatively, the signal generator 14 may be connected to the measurement instrument 16 and may transmit information on the reference signal to the measurement instrument 16, for example the sample rate, a symbol rate of the reference signal and/or information on the symbol points in the reference signal.

The additional information on the input signal and/or on the reference signal may be employed by the synchronization module 22 in order to synchronize the input signal and the reference signal.

The synchronized input signal and the reference signal are forwarded to the signal processing module 28.

Moreover, an error signal is generated by subtracting the reference signal from the synchronized input signal (step S3). In FIG. 1, the error signal is denoted by "error". The error signal is forwarded to the signal processing module 28.

The signal processing module 28 determines symbol points of the symbol sequence comprised in the reference signal (step S4). The symbol points of the synchronized input signal are the same as the symbol points of the reference signal because the input signal and the reference signal are synchronized. Thus, by determining the symbol points in the reference signal, also the symbol points in the synchronized input signal are determined.

Therein, the term "symbol point" is understood to denote the time at which the respective symbol is detected. For example, the symbol point may be the time at which the input signal crosses a decision threshold that is associated with a certain signal value.

In step S4, the symbol points are determined based on the samples corresponding to the reference signal that are received from the signal generator 14 and based on a symbol rate of the reference signal (which is the same as the symbol rate of the synchronized input signal).

The symbol rate may be known. For example, the symbol rate or rather the ratio between the symbol rate and the sample rate may be set by a user via a user interface of the measurement instrument 16. Alternatively or additionally, the symbol rate may be estimated by the signal processing module 28 via a blind symbol rate estimation technique and/or via a machine learning technique.

It is noted that the symbol points are determined without demodulating the input signal and the reference signal. Instead, the signal points are determined directly based on the received samples and based on the symbol rate.

Optionally, the signal processing module 28 may receive the additional information on the input signal and/or on the reference signal described above. The signal processing module 28 may employ the additional information in order to determine the signal points.

Measurement times are determined based on the determined signal points via the signal processing module 28 (step S5). Generally, the measurement times are times at which quality measurements shall be performed, as will be described in more detail below. In other words, the measurement times are associated with portions of the input signal that are of particular relevance for assessing the performance of the device under test 12.

For example, if the device under test 12 is established as a receiver, the most important portions of the input signal are the signal points. Thus, the measurement times may be equal to the signal points.

For other devices under test 12, another portion of the input signal may be more relevant for assessing the performance of the device under test 12. For example, if a middle portion of the individual symbols in the input signal is of particular relevance, the measurement times may be determined to be equal to the respective symbol points plus half of the symbol duration.

The symbol points and/or the measurement times may respectively lie in between two consecutive samples of the synchronized input signal, of the reference signal and/or of the error signal if the sample rate is not an integer multiple of the symbol rate.

The synchronized input signal, the reference signal and/or the error signal are then resampled, thereby generating a set of resamples, and the set of resamples Is forwarded to the evaluation module 30 (step S6). The set of resamples comprises samples of the synchronized input signal, of the reference signal and/or of the error signal at the measurement times. The set of resamples may be generated by interpolating the samples of the synchronized input signal, of the reference signal and/or of the error signal.

Based on the set of resamples, at least one signal quality parameter is determined at the measurement times via the evaluation module 30 (step S7). In some embodiments, the at least one signal quality parameter is determined based on the set of resamples associated with the synchronized input signal, the reference signal and/or the error signal.

In general, the at least one signal quality parameter is indicative of a signal quality of the input signal. Thus, the at least one signal quality parameter is indicative of a performance of the device under test 12. In other words, the at least one signal quality parameter is a measure for the assessment of the performance of the device under test 12.

In some embodiments, the at least one signal quality parameter corresponds to an error-magnitude-vector parameter. For example, the at least one signal quality parameter may be a magnitude error and/or a phase error of the synchronized input signal with respect to the reference signal at the measurement times.

Thus, the quality measurements are not performed for every sample, which would be the case for raw EVM measurements known in the state of the art. Instead, the quality measurements are performed only at the relevant times, namely the measurement times. Accordingly, only the relevant portions of the synchronized input signal are included for assessing the performance of the device under test 12.

A plot of the at least one signal quality parameter, a plot of the input signal, a plot of the reference signal and/or a plot of the error signal against the measurement times may be generated and displayed on the display 26 (step S8).

In other words, the signal quality parameter, the input signal, the reference signal and/or the error signal are not plotted for all available samples, but only for the relevant samples, namely for the samples at the measurement times.

It is emphasized that no demodulation of the input signal and/or of the reference signal is required to perform the signal analysis method described above. Instead, the symbol points and the measurement times are determined directly based on the input signal and the reference signal or rather based on the received samples associated with the reference signal. Thus, the one or methods disclosed herein are carried out without demodulation of the input signal and/or of the reference signal (e.g., the input signal and/or of the reference signal is not demodulated.)

Thus, all types of quality measurements requiring knowledge of the symbol points can be performed without demodulating the input signal and/or the reference signal.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal analysis method, said signal analysis method comprising:
receiving an input signal, said input signal comprising a symbol sequence;
receiving samples of a reference signal based on a known sample rate, said reference signal comprising the same symbol sequence as said input signal;
determining symbol points of said symbol sequence based on said samples;
determining measurement times based on said symbol points; and
determining at least one signal quality parameter at said measurement times,
wherein said at least one signal quality parameter is indicative of a signal quality of said input signal.

2. The signal analysis method of claim 1, wherein said measurement times are equal to said symbol points.

3. The signal analysis method of claim 1, wherein a symbol rate of said symbol sequence is known, or wherein said symbol rate is determined based on said samples.

4. The signal analysis method of claim 3, wherein said symbol points are determined based on said symbol rate.

5. The signal analysis method of claim 1, wherein at least one of said input signal and said reference signal is resampled, thereby generating a set of resamples, wherein said set of resamples comprises at least one of samples at said symbol points and samples at said measurement times.

6. The signal analysis method of claim 1, wherein said input signal and said reference signal are synchronized based on at least one of said symbol points and said measurement times.

7. The signal analysis method of claim 1, wherein said at least one signal quality parameter corresponds to an error-magnitude-vector parameter.

8. The signal analysis method of claim 1, wherein said reference signal comprises at least one marker.

9. The signal analysis method of claim 1, wherein at least one of said input signal, said reference signal and said at least one signal quality parameter is plotted against said measurement times.

10. A measurement system, comprising:
a first input configured to receive an input signal, said input signal comprising a symbol sequence;
a second input configured to receive a reference signal associated with samples based on a known sample rate, said reference signal comprising the same symbol sequence as said input signal; and a signal analysis circuit configured to:
- determine symbol points of said symbol sequence based on said samples,
- determine measurement times based on said symbol points; and
- determine at least one signal quality parameter at said measurement times, wherein said at least one signal quality parameter is indicative of a signal quality of the input signal.

11. The measurement system of claim 10, wherein said measurement times are equal to said symbol points.

12. The measurement system of claim 10, wherein said signal analysis circuit is configured to receive a symbol rate of said symbol sequence, or wherein said signal analysis circuit is configured to determine said symbol rate based on said samples.

13. The measurement system of claim 12, wherein said signal analysis circuit is configured to determine said measurement times based on said symbol rate.

14. The measurement system of claim 10, wherein said signal analysis circuit is configured to resample at least one of said input signal and said reference signal, thereby generating a set of resamples, wherein said set of resamples comprises at least one of samples at said symbol points and samples at said measurement times.

15. The measurement system of claim 10, further comprising a synchronization circuit being associated with the first input and with the second input, said synchronization circuit being configured to synchronize said input signal and said reference signal based on at least one of said symbol points and said measurement times.

16. The measurement system of claim 10, wherein said at least one signal quality parameter corresponds to an error-magnitude-vector parameter.

17. The measurement system of claim 10, wherein said reference signal comprises a marker.

18. The measurement system of claim 10, wherein said signal analysis circuit is configured to generate a plot of at least one of said input signal, said reference signal and said at least one signal quality parameter against said measurement times.

19. The measurement system of claim 18, further comprising a display, said display being configured to display said plot.

* * * * *